United States Patent Office 3,200,137
Patented Aug. 10, 1965

3,200,137
CHLORINATED BIS(SILYL)BENZENES
George M. Omietanski, Tonawanda, and Wallace G. Reid, Grand Island, N.Y., assignors to Union Carbide Corporation, a corporation of New York
No Drawing. Filed Sept. 29, 1961, Ser. No. 141,623
3 Claims. (Cl. 260—448.2)

This invention relates to novel organosilicon compounds. More particularly, this invention relates to novel chlorinated organosilanes having the formula

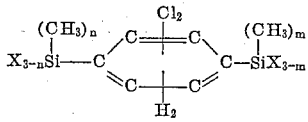

wherein X is a member of the class consisting of halogen, hydroxy, alkoxy and acyloxy groups, $n$ is an integer of from 0 to 2 and $m$ is an integer of from 0 to 2.

Illustrative of the groups represented by X are the halogens, such as, fluorine, chlorine, bromine and the like; alkoxy groups such as, methoxy, ethoxy, propoxy, butoxy, octyloxy, octadecyloxy and the like; the acyloxy groups such as acetoxy, butyroxy, and the like; and hydroxy groups.

Illustrative of the novel chlorinated organosilanes of this invention are bis(trichlorosilyl)dichlorobenzene, bis-(methyldifluorosilyl)dichlorobenzene, bis(dimethylfluorosilyl)dichlorobenzene, bis(triethoxysilyl)dichlorobenzene, bis(methyldipropoxysilyl)dichlorobenzene, bis(dimethylbutoxysilyl)dichlorobenzene, bis(hydroxydimethylsilyl)dichlorobenzene, bis(acetoxydimethylsilyl)dichlorobenzene, and the like.

The novel chlorinated organosilanes of this invention wherein X is halogen, are prepared by the reaction of a bis(silyl)benzene of the formula

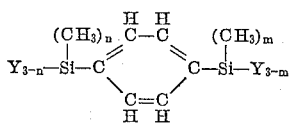

wherein Y is halogen as defined for X and $m$ and $n$ are as above-defined, with chlorine gas employing anhydrous aluminum chloride as a catalyst and carbon tetrachloride as a cataylst and carbon tetrachloride as a solvent. The reaction which takes place is illustrated by the following equation showing the reaction of chlorine with bis(dimethylchlorosily)benzene:

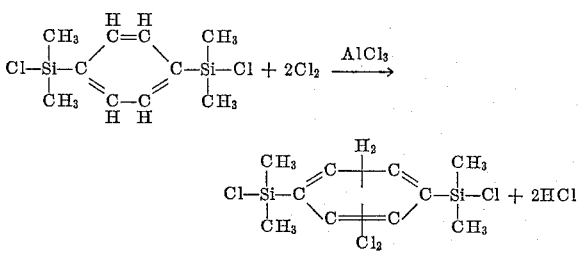

The reaction is carried out according to the following general prooceduce:

The bis-silyl benzene is dissolved in anhydrous carbon tetrachloride and aluminum chloride is added so that the solution contains from 0.01 to about 2 percent by weight aluminum chloride. The solution is then heated to from about 50° C. to its reflux temperature and chlorine gas is introduced into the solution, preferably at a point near the bottom of the reaction vessel. The reaction mixture can be agitated only by the stream of chlorine gas or a mechanical means can be employed, if desired. After an amount of chlorine gas equal to about or in excess of 2 moles of chlorine per mole of the bis-silyl benzene has been bubbled into the reaction mixture, the mixture is cooled and filtered. The filtrate is then distilled at atmospheric pressure or under reduced pressure to remove the carbon tetrachloride. The residue is then fractionated at reduced pressure to yield the bis(silyl)dichlorobenzene.

The amount of anhydrous aluminum chloride employed as the catalyst for this reaction can be from 0.01 to 2.0 parts by weight of aluminum chloride per 100 parts by weight of the reaction solutions, that is, the bis-silylbenzene and carbon tetrachloride. It is preferred to employ from 0.1 to 1.0 part by weight aluminum chloride per 100 parts by weight of the reaction solution for convenience and to obtain a reasonable rate of reaction.

It is preferred that the carbon tetrachloride employed as the solvent for the reaction be anhydrous so as to prevent side reactions such as hydrolysis of any hydrolyzable groups bonded to the silicon atom or the hydration of the aluminum chloride catalyst.

The bis-silyl-benzenes which can be employed as starting materials in producing the novel chlorinated organosilanes of the invention are those having the formula

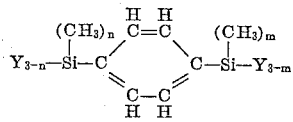

where Y, $n$ and $m$ have the above-defined meanings.

The bis-silyl-benzenes are produced by a Grignard reaction employing para-dibromobenzene and a chlorosilane of the formula, $(CH_3)_fSiCl_{4-f}$ wherein $f$ is an integer of from 0 to 2.

The alkoxy and acyloxy bis-silyl-dichlorobenzenes of this invention is produced by the reaction of the corresponding bis(halosilyl)dichlorobenzene with an alkanol or aliphatic acid whereby the hydrogen of the OH group of the alkanol or acid reacts with the halo group of the bis-(halosilyl)dichlorobenzene to form the corresponding hydrohalic acid and the bis(alkoxysilyl)dichlorobenzene or bis(acyloxysilyl)dichlorobenzene.

The bis(hydroxysilyl)dichlorobenzenes of this invention are produced by the hydrolysis of the bis-(halo-, acyloxy-, or alkoxysilyl)dichlorobenzene in a benzene solution with an excess of ammonium hydroxides at 0° C.

The novel chlorinated organosilanes of this invention find utility as additives to known silicone oils to improve their lubricity and/or flame resistance. The novel chloronated organosilanes of the invention can also be co-hydrolyzed and co-condensed by known procedures with silanes of the formula, $R'_xSiX_{4-x}$, wherein X is as above defined, R is a monovalent hydrocarbon group such as methyl, ethyl, phenyl, naphthyl, vinyl, allyl, phenylethyl, tolyl and the like, and $x$ is an integer of from 0 to 3, under acidic or basic reaction to yield organopolysiloxane copolymeric resins having improved flame resistance or copolymeric organopolysiloxane oils having improved flame resistance and improved lubricity.

The following examples serve to further illustrate the invention.

*Example 1*

A 2-liter, 3-necked flask was fitted with a stirrer, reflux condenser and a gas inlet tube. A mixture of 105 grams (0.4 mole) of 1,4-bis(dimethylchlorosilyl)benzene, 300 grams of carbon tetrachloride, and 1.6 grams of anhydrous aluminum chloride were placed in the flask and the flask and contents heated to 70° C. A rapid stream of chlorine gas was passed through the mixture for 12 hours. The reaction mixture was cooled, filtered and the filtrate distilled under reduced pressure to yield 43.0 grams (0.077 mole) of a product having a boiling point of 104–110° C. at 3 mm. Hg, which was identified as 1,4-bis(dimethylchlorosilyl)dichlorobenzene. The 1,4-bis-(dimethylchlorosilyl)dichlorobenzene gave the following analysis:

Calculated for $C_{10}H_{14}Cl_4Si_2$: 36.2% C; 3.9% H; 22.7% Cl; 6.8% Si. Found 35.9% C; 4.3% H; 43.3% Cl; 15.6% Si.

*Example 2*

The product obtained in Example 1 was dissolved in 250 ml. of benzene and hydrolyzed with an excess of aqueous ammonium hydroxide at 0° C. A gummy precipitate formed as the reaction warmed to room temperature. The gummy precipitate was recrystallized from hot benzene and there was obtained 5.7 grams (15 mole-percent) of 1,4-bis(dimethylhydroxysilyl)-2,5-dichlorobenzene, melting point with decomposition 172–176° C. The structure was verified by infra-red analysis. Elemental analysis of the 1,4-bis(dimethylhydroxysilyl)-2,5-dichlorobenzene gave the following results:

Calculated for $C_{10}H_{16}Cl_2O_2Si_2$: 40.6% C; 5.4% H; 24.0% Cl; 19.0% Si. Found: 40.6% C; 5.5% H; 21.9% Cl; 18.8% Si.

*Example 3*

1,4-bis(dimethylhydroxysilyl)-2,5-dichlorobenzene was mixed with about twice its weight of octamethylcyclotetrasiloxane and equilibrated and condensed at 150° C. for 16 hours employing cesium hydroxide as a catalyst. There was obtained a tough polysiloxane gum which had the odor of p-dichlorobenzene.

The polysiloxane gum can be milled with a finely divided silica filler and dibenzoyl peroxide according to standard procedures and then heated to 250° F. for 15 minutes in a pre-heated mold (6″ x 6″ x .075″) to yield an elastomer.

What is claimed is:
1. An organosilicon compound having the formula

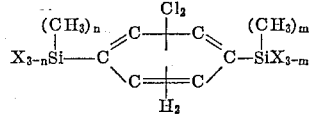

wherein X is a member of the class consisting of halogen, hydroxy, alkoxy and acyloxy, $m$ is an integer of from 0 to 2 and $n$ is an integer of from 0 to 2.
2. 1,4-bis(dimethylchlorosilyl)dichlorobenzene.
3. 1,4-bis(dimethylhydroxysilyl)-2,5-dichlorobenzene.

References Cited by the Examiner
UNITED STATES PATENTS

| | | | |
|---|---|---|---|
| 2,499,561 | 3/50 | Barry | 260—448.2 |
| 2,561,429 | 7/51 | Sveda | 260—448.2 |
| 3,053,872 | 9/62 | Omietanski | 260—448.2 |
| 3,117,149 | 1/64 | Holdstock | 260—448.2 |

FOREIGN PATENTS

| | | |
|---|---|---|
| 1,246,989 | 10/60 | France. |
| 771,587 | 4/57 | Great Britain. |

TOBIAS E. LEVOW, *Primary Examiner.*

ALPHONSO D. SULLIVAN, SAMUEL H. BLECH, *Examiners.*